United States Patent [19]
Gidon et al.

[11] Patent Number: 5,093,884
[45] Date of Patent: Mar. 3, 1992

[54] INTEGRATED MONOMODE SPATIAL OPTICAL FILTER AND ITS METHOD OF EMBODIMENT

[75] Inventors: Pierre Gidon, Echirolles; Jean-Pierre Jadot, Meylan; Stéphane Renard, Champ sur Drac; Serge Valette, Grenoble, all of France

[73] Assignee: Commissariat a l'Energie Atomique, Paris, France

[21] Appl. No.: 714,288

[22] Filed: Jun. 12, 1991

[30] Foreign Application Priority Data

Jun. 13, 1990 [FR] France .................. 90 07349

[51] Int. Cl.$^5$ .................. G02B 6/12; H01L 21/70
[52] U.S. Cl. .................. 385/132; 385/14; 385/29; 385/32; 385/146; 437/51; 437/141; 437/228
[58] Field of Search ............... 350/96.11, 96.12, 96.13, 350/96.14, 96.15, 96.19, 96.29, 96.30, 320, 311; 437/51, 134, 228, 225, 141, 152

[56] References Cited

U.S. PATENT DOCUMENTS

| | | | |
|---|---|---|---|
| 4,185,256 | 1/1980 | Scifres et al. | 350/96.11 X |
| 4,372,641 | 2/1983 | Johnson et al. | 350/96.12 |
| 4,530,078 | 7/1985 | Lagakos et al. | 350/96.29 X |
| 4,768,851 | 9/1988 | Shaw et al. | 350/96.15 |
| 4,810,049 | 3/1989 | Fischer et al. | 350/96.12 |
| 4,887,879 | 12/1989 | Prucnal et al. | 350/96.15 |
| 4,901,123 | 2/1990 | Noguchi et al. | 350/96.11 X |
| 4,929,302 | 5/1990 | Vallette | 350/96.12 X |
| 4,938,553 | 7/1990 | Maerz et al. | 350/96.11 |
| 4,974,931 | 12/1990 | Poole | 350/96.29 |
| 5,006,906 | 4/1991 | Deri | 350/96.15 X |
| 5,015,051 | 5/1991 | Castera et al. | 350/96.12 |

FOREIGN PATENT DOCUMENTS

| | | | |
|---|---|---|---|
| 0330457 | 8/1989 | European Pat. Off. | 350/96.11 X |
| 52-127253 | 10/1977 | Japan | 350/96.15 X |
| 2209844 | 5/1989 | United Kingdom | 350/96.11 X |

Primary Examiner—Brian Healy

[57] ABSTRACT

Integrated monomode spatial optical filter and its method of embodiment. The optical filter of the invention for isolating one first optical mode and eliminating second stray optical modes consists of an optical microguide (4) borne by a substrate (2) and having along a plane parallel to the surface (P) of the substrate at least one curved portion (6) whose radius of curvature is such that the losses in the curve of the first and second modes are respectively negligible and extremely high and two light absorbers (8, 10) disposed within a given plane on both sides of the curved portion (6).

22 Claims, 4 Drawing Sheets

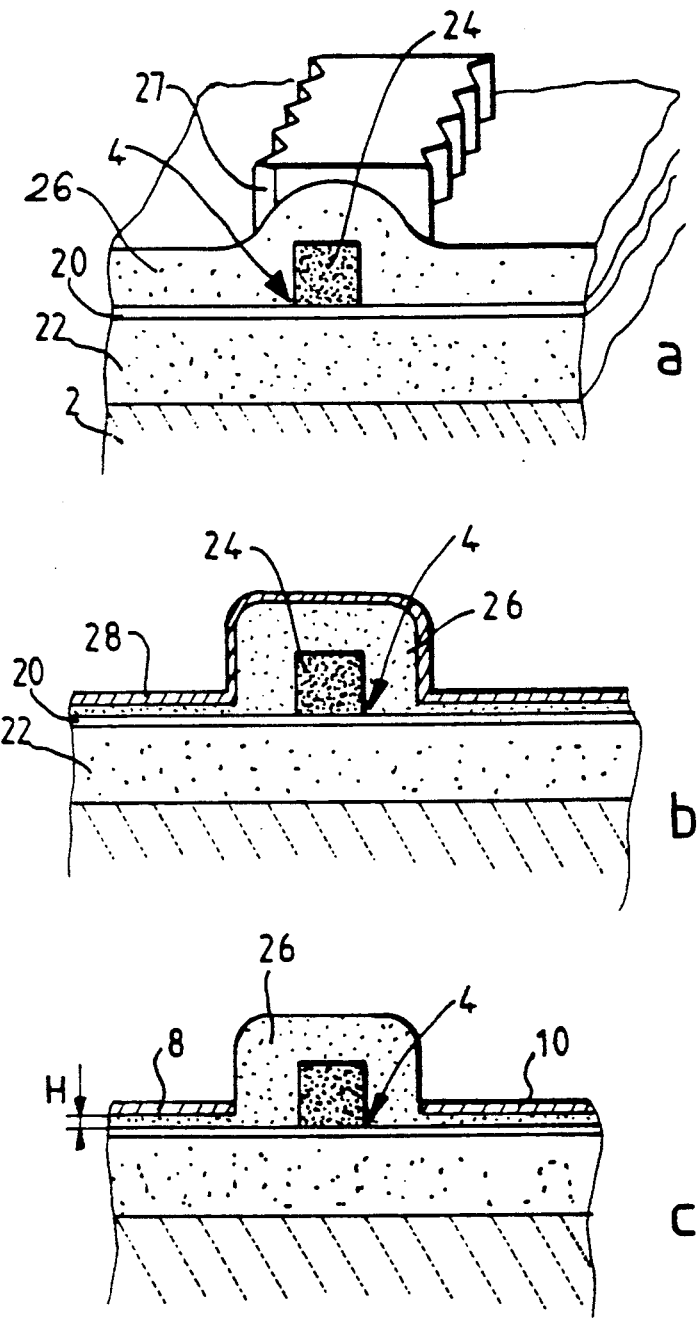
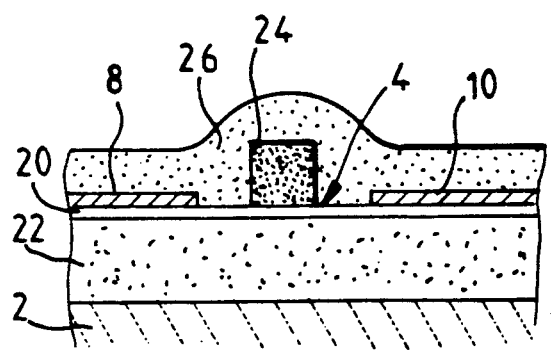
FIG. 4
FIG. 5

INTEGRATED MONOMODE SPATIAL OPTICAL FILTER AND ITS METHOD OF EMBODIMENT

FIELD OF THE INVENTION

The present invention concerns a monomode spatial optical filter for integrated optics and its method of embodiment. In particular, the invention can be applied for the real time processing of radar signals, such as in correlators, spectrum analyzers or interferometric devices, or can be used in optical channel telecommunications applications and optical fiber sensor applications.

BACKGROUND OF THE INVENTION

In conventional optics, a spatial filter makes it possible to obtain a luminous beam freed from any imperfections linked to diffraction phenomena (interference rings).

In integrated optics, the problem is somewhat different. In fact, this involves isolating from a wave guide structure one single mode and ensure that it is this single mode that is able to extend inside the guide film of the structure.

A wave guide structure generally consists of a buffer film, a guide film and an upper film all stacked on a substrate, the guide film having a real refraction index greater than that of the buffer and upper films. In certain cases, the upper film may be replaced by air.

Strictly speaking, one could expect that the isolation of a mode in integrated optics would be relatively simple. In fact, a light microguide may easily be calculated and embodied so as to merely have a single guided mode. But these factors rely heavily on two points.

First of all, in theory, a guided mode is a mode of nil losses if the propagation media are not absorbant.

In practice and in the best of cases, there are still losses of between about 0.05 and 0.2 dB/cm.

In parallel with this guided mode, there are still other possibilities concerning the light to extend inside an integrated optical structure; these are substrate modes whose theoretical losses are no longer nil; they then only undergo partial reflections in the wave guide and, because of this, one portion of the energy leaks out into the substrate and is thus lost.

These substrate modes still exist in theory and according to the microguide structures in question, their theoretical losses able to vary between one fraction of dB/cm to several tens of dB/cm. This means that over short distances (100 μm to several millimeters), their attenuation remains slight. They thus generate stray light which, in certain applications, may be extremely disadvantageous.

For certain microguide structures, in which the shape and dimensions of the microguide are fixed by etching of the upper film (structures known under the name of "rib waveguide" or "rib channel guide"), the light may also be planary-guided outside the microguide. This is the case with Si/SiO2/Si3N4/SiO2 structures developed in the electronic laboratory of the Applicant.

In these structures, the light remains confined in the effective high index region (that is, under the etched upper film), but it may also be guided into adjacent regions and especially when injection of light into the microguide is not perfect.

The second point posing a problem is as follows:

In fact, in practice it is not possible to inject light into a monomode wave guide structure and only excite the mode guided into this structure.

In order to do this, it is necessary to inject a distribution of luminous amplitude (by means of a monomode optical fiber or with a laser diode) strictly identical to that of the guided mode of the structure and superimposed on the latter. However, this is impossible to embody technically.

Moreover, certain integrated optical components themselves generate stray light by virtue of their instrinsic defects (surface roughness, punctual defects, etc). Also, even if the injection of light into the microguide were perfect, this second problem would still exist. Thus results in the following drawbacks:

a) increase of the stray light percentage,
b) instability of the optical signal as this stray light may interfere with the guided light. Owing to the different effective indices involved, external interference does not act identically on the phase of the guided mode and on that of the stray light causing continuous fluctiations.

This problem is mainly identified on quiet complex devices sensitive to stray light, such as interferometric devices (displacement sensor, integrated optical gyrometer).

SUMMARY OF THE INVENTION

The object of the invention is to provide on integrated monomode spatial optical filter and its method of embodiment enabling the various drawbacks mentioned above to be resolved. In particular, this filter makes it possible to avoid any stray light extending into an integrated monomode optical guide structure.

More specifically, the object of the invention concerns an integrated monomode spatial optical filter for isolating a first optical mode and eliminating second stray optical modes, wherein it consists of an optical monomode borne by a substrate and having, along a plane parallel to the surface of the substrate at least one curved portion whose radius of curvature is such that the losses in the curve of the first and second modes are respectively negligible and extremely high and two light absorbers disposed within a given plane on both sides of the curved portion of the microguide.

The shape of the microguide makes it possible to eliminate any stray light. In fact, only the stray light generated in the immediate proximity of the microguide is disruptive. In addition, any stray light generated either in the substrate or planary guided mode generated on both sides of the microguide at its inlet may only extend on a straight line.

Also, even if the microguide is not strictly monomode (for example, because of technical uncertainties), the curved portion of the microguide ensures a large amount of selectivity owing to the fact that the losses in this curved portion are completely different between the guided modes, the first mode still being the one having the least loss.

The radii of curvature and the lengths of the various straight sections of the microguide are preferably calculated so as to have a minimum spacing D between the inlet and outlet of the microguide measured inside the plane parallel to the surface of the substrate.

The microguide may have various shapes. However, the devices embodied in integrated optics generally have an optical axis with an imposed direction so as to respond to the problems of the shape, compactness and disposition of the components.

Also, the microguide of the filter of the invention has, in the plane parallel to the surface of the substrate, a somewhat "S" shape. In the continuation of the text, what is specified for an "S"-shaped microguide of course remains valid for a microguide having a single curve whose sole limit is of having a radius of curvature satisfying the definitions mentioned above.

So as to ensure a good absorbtion of the stray light by the absorbers, the latter extend advantageously fully along the curved portion and accordingly along the "S".

Furthermore, so as to avoid any reflection of the stray light to the interface of the absorbers, which could be then reinjected into the microguide, the surface of each absorber opposite the microguide is toothed or notched.

In fact, it is essential to emphasize that an absorber modifies the actual portion of the refraction index of the guided mode and thus results in an index discontinuity and accordingly in potential stray reflections. The toothed or notched shape of these absorbers ensures that these reflections are unable to generate the stray light in the propagation direction of the guided light, that is in the direction of the microguide.

Moreover, the absorbers need to have a geometrical shape so as to avoid any stray trapping of light and in particular have a geometrical dissymetrical shape with respect to the propagation axis of the ligh (that is, the optical axis of the filter). The teeth or notches of the absorbers are in addition spaced irregularly.

The use of an "S"-shaped microguide and a minimum spacing D between its inlet and its outlet also results from the fact that the absorbers cannot be placed immediately close to the microguide as they would also absorb the light it is desired to extend. Also, there is a minimum distance d to be observed between the absorbers and the edges of the microguide and, in particular, in the case of toothed absorbers between the saw teeth and the edges of the microguide.

This minimum distance depends on the guide structure used and the depth of the teeth of the absorbers. It needs to be as small as possible whilst avoiding absorption of the mode it is desired to propagate. In practice, this minimum distance, measured in a plane parallel to the surface of the substrate, is between 3 and 10 $\mu$m.

If b is the width of the microguide, in a first approximation, one can say that $D > 2d + b$. In practice, an adequate margin of safety is taken to ensure that this inequality is still verified.

However, as the radii of curvature are still imposed for effective filtering, it is desirable that D be not too large as this adversely affects the general spacing requirement of the integrated optical device equipped with such filters.

In practice, D is taken as being between 20 and 50 $\mu$m.

The radii of curvature of the "S" depend, as mentioned previously, on the guided structures and mainly on the lateral index difference (real for geniune microguides or effective for "rib waveguides").

By way of example, for an index difference of $5.10^{-3}$, the minimum radius of curvature of the "S" is between 5 and 15 mm and, for an index difference of $5.10^{-2}$, the minimum radius of curvature is between 0.2 and 2 mm, depending on the shapes involved. Thus, the radius of curvatuure reduces when the index difference increases.

The nature of the absorbers mainly depends on the index difference involved in the structure and on the active wave length.

When this index difference is large, that is more than 0.1 and usually between 0.1 and 0.5, the absorbers may be made of metal and in particular of aluminum, titanium, silver, a chrome and gold alloy, etc., and their thickness may be any, such as between 10 and 500 nm.

If the index difference in question in the structure is slight, that is less than 0.02 and typically between $5.10^{-3}$ and $2.10^{-2}$, two embodiments are possible for the absorbers.

According to a first embodiment, these absorbers may be made of a metal, such as one of those mentioned above, having a slight thickness measured along a direction perpendicular to the surface of the substrate, this thickness being smaller than the depth of penetration of the stray light into the metal used. Generally speaking, this thickness is selected as being smaller than 20 nm, such as between 5 and 15 nm.

This thin metal allows for much higher absorption than previously due to the fact that multiple reflections inside the metal become possible; the optimal metal thickness depends in particular on the absorption coeffecient of the latter.

By way of example, for aluminum absorbers, this optimal thickness is 15 nm.

Advantageously, this thin metal film may be covered by any nonconductor. As a nonconductor able to be used in association with a metal film for the constitution of the absorbers, this may be silica, glues or optical polymers, such as PMMA (polymethylmethacrylate).

According to a second embodiment of absorbers for a structure with a slight index difference, an absorbing nonconductive or semiconductive material is used whose real refraction index n is close to the real refraction index n' of the upper film and whose imaginary refraction index n" satisfies the equation $n''^2 \leq (n-n')^2$.

This makes it possible to minimize reflection of light at the absorber/guide interface and favor them fleeing towards the absorbant medium.

The guiding structures used for embodiment of the spatial filter may be of any type. In particular, they may be selected according to the guiding structure of the optical components associated with the filter in complex integrated optical devices.

In particular, the guiding structure may be embodied in glass, lithium niobate, and in semiconductive multifilm structures, such as the structures III-V or II-VI. For example, it is possible to use one of the following structures:

Glass/glass doped by ion/SiO2 exchange,
Si/SiO2/Si3N4/SiO2
Si/SiO2/SiOxNy/SiO2 with $0 < x < 2$ and $0 < y < 4/3$.
Si/SiO2/SiO2 doped/SiO2, the dopers of the guide film being such that the latter has a refraction index larger than that of the adjacent films, such as phosphorus, germanium, titanium or nitrogen.

It is also possible to replace the Si3N4 guide film by aluminium and/or dope the silica used as a buffer film and the upper film of the guiding structure by a doper reducing the refraction index of the silica, such as fluorine or boron or by a doper increasing the refraction index of the silica. Of course, the guide film still needs to have a refraction index exceeding that of the upper and buffer films.

As an absorbant nonconductor intended to solely constitute the absorbers and able to be used in the invention, this may be a polymer, such as a photosensitive resin or a polymer (PMMA, for example) doped by coloring agents. For an active wavelength of about 800 nm, Styryl-9 or Styryl-8 is used as a colring agent commercialized by the Lambda Physik company. For an active wavelength in the red spectrum, it is possible to use rhodamines as a coloring agent, such as rhodamine B or 6-G commercialized by Lambda Physik.

This absorbant nonconductive material may also be replaced by an absorbant semiconductor, such as Si, CdTe, GaAs according to the use wavelengths. However, these semiconductors do not precisely satisfy the recommended real index equality previously referred to in the case of an upper silica film.

In the guiding structures referred to earlier, the microguide may be defined by etching of the upper film or the guide film.

When the upper film of the guide structure is etched to fix the shape of the microguide, it is preferable to protect the optical filter by a nonconductor whose refraction index is at the most equal to that of the upper film.

However, the invention is also applicable to an optical filter whose microguide is not protected. In these circumstances, the absorbers are made of an absorbant film etched according to the desired patterns and directly borne by the guide film and disposed on both sides of the upper etched film.

When the microguide is fully protected, the absorbers may consist of one absorbant film fully coating the microguide.

It is also possible to provide a protection nonconductor constituting the ultimate film of the optical filter ensuring protection of the microguide and the absorber.

The object of the invention is also to provide a method to embody a monomode optical filter, such as defined previously.

Generally speaking, this method is characterized in that it consists of forming an optical microguide on a substrate, this microguide having along a plane parallel to the surface of the substrate at least one curved portion whose radius of curvature is such that the losses in the curve of the first and second modes are respectively negligible and extremely significant, and of forming two light absorbers in a given plane on both sides of the curved portion of the microguide.

According to a first embodiment, the method of the invention includes the following stages:

a) depositing a first film on the substrate, b) etching of this first film so as to form the microguide, c) depositing a second film on the structure obtained at b and having a refraction index equal at the most to that of the first film, d) etching of the second film on both sides of the microguide so as to fix the shape of the absorbers, e) depositing an absorbant film on the structure obtained at d, and possibly f) etching of the absorbant film so as to delimit the absorbers.

According to a first variant of this first embodiment, this method includes the following stages:

A) successive depositings of a buffer film and a guide film on the substrate, the guide film having a refraction index larger than that of the buffer film, B) etching of the guide film so as to form the microguide, C) depositing of an upper film on the structure obtained at B and having a refraction index smaller than that of the guide film, D) etching of the upper film on both sides of the microguide so as to fix the shape of the absorbers, E) depositing of an absorbant film on the structure obtained at D, and possibly F) etching of the absorbant film so as to delimit the absorbers.

This first variant is preferably used when the guide structure has a slight index variation.

According to a second variant, this method includes the following stages:

a') successive depositing of a buffer film, a guide film and an upper film on the substrate, the guide film having a refraction index larger than that of the buffer and upper films, b') etching of the upper film so as to form the microguide, c') depositing a protection film on the structure obtained at b and having a refraction index equal at the most to that of the upper film, d') etching of the protection film on both sides of the microguide so as to fix the shape of the absorbers, e') depositing an absorbant film on the structure obtained at d' and possibly, f') etching of the absorbant film so as to delimit the absorbers.

This second variant is advantageously used for a structure having a high index variation.

According to a second embodiment, the method of the invention includes the following stages:

A') successive depositings of a buffer film, a guide film and an upper film on the substrate, the guide film having a refraction larger than that of the buffer and upper films, B') etching of the upper film so as to form the microguide, C') depositing an absorbant film on the structure obtained at B', D') etching of the absorbant film so as to fix the shape of the absorbers, and E') possible depositing of a protection film on the structure obtained at D' and having a refraction index equal at the most to that of the upper film.

This second embodiment is able to be favorably used in the case of a structure having a high index variation.

BRIEF DESCRIPTION OF THE DRAWINGS

Other characteristics and advantages of the invention shall appear more readily from a reading of the following description, given by way of illustration and being non-restrictive, with reference to the accompanying drawings on which:

FIG. 5 is an embodiment variant of the method of the invention.

DETAILED DESCRIPTION OF THE PREFERRED EMBODIMENTS

Figure 1:
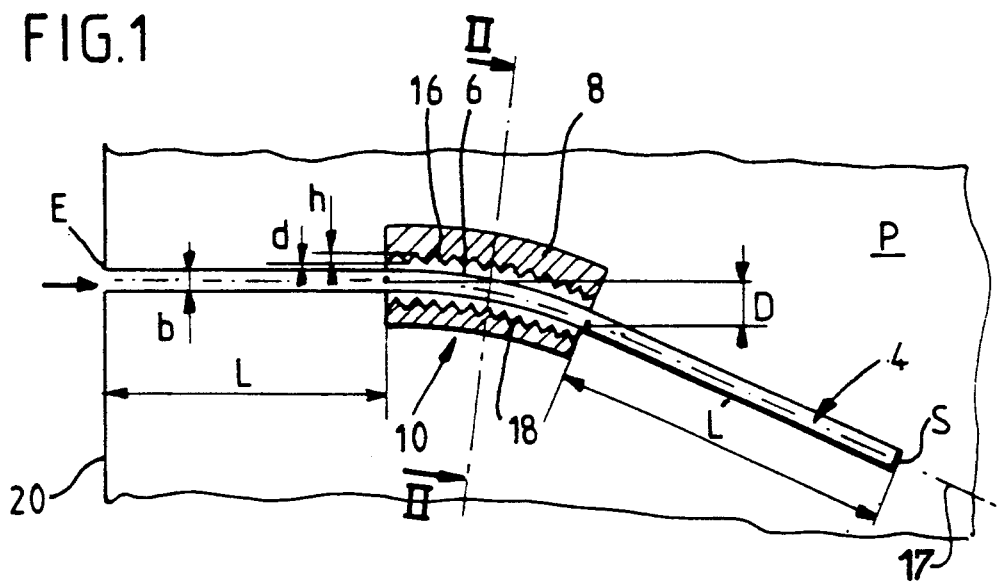
FIG. 1 diagrammatically shows a top view of a spatial optical filter conforming to the invention, FIG. 2 diagrammatically shows a cutaway view along the line II of FIG. 1 of a first embodiment variant of the optical filter of the invention, FIG. 3 diagrammatically shows a top view of a preferred embodiment of the spatial filter of the invention, FIG. 4a-c diagrammatically shows a cutaway view of the production stages of an optical filter according to a first method conforming to the invention.
Figure 2:
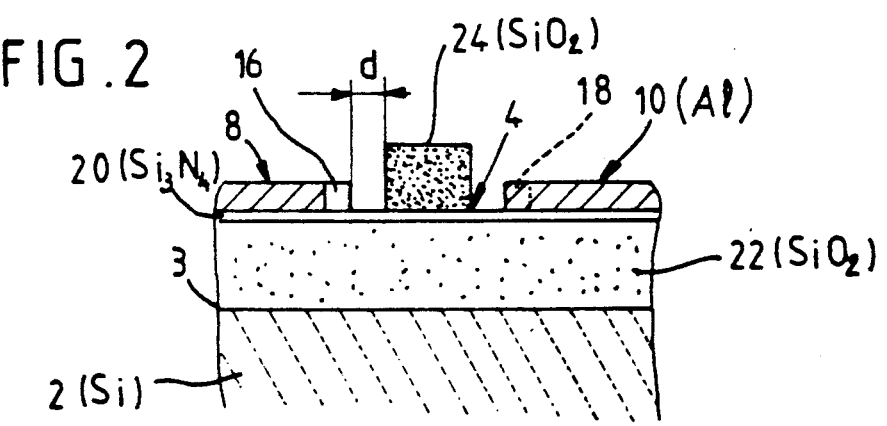

The integrated monomode spatial optical filter of the invention shown on FIGS. 1 and 2 comprises on a substrate 2 an optical microguide 4 having within the plane P parallel to the surface 3 of the substrate a curved portion 6 along which two absorbers 8 and 10 extend. These absorbers are disposed on both sides of the microguide in the plane P, and their side opposite the microguide comprises teeth, respectively 16 and 18. The teeth 16 and 18 are spaced irregularly and/or offset with respect to one another so that there is no geometrical symmetry with respect to the optical axis 17 of the filter.

The lateral space D, measured in the plane P between the inlet E and outlet S of the microguide, is selected as being between 20 and 50 μm. In addition, the depth h of the teeth of each absorber is selected as being between 5 and 20 μm according to the lateral confinement of the guide modes in question. Finally, the minimum distance d separating each absorber from the edges of the microguide and representing the distance separating the extremity of the teeth of the edges of the microguide is between 3 and 10 μm.

In its simplest embodiment, as shown on FIG. 2, the microguide 4 consists of a guide film 20 inserted between a buffer film 22 and an upper film 24 known as a superstrate 24, the buffer film 22 being placed between the guide film 20 and the substrate 2. The buffer film 22 and the superstrate 24 have refraction indices smaller than that of the guide film 20.

The embodiment shown on FIG. 2 is mainly intended for a guide structure with a high index variation, that is one with an index variation of more than 0.1 between the guide film and the upper and buffer films.

In the rest of this text, the refraction indices shall be given for an active wavelength of 800 nm.

For example, the substrate 2 is made of monocrystalline silicon; the buffer film 22 is silicon oxide not intentionally doped with a thickness of between 1 and 12 μm and obtained by the high pressure thermic oxidation of the substrate or by means of a plasma-assisted chemical vapor depositing (PECVD); the guide film 20 is a film of silicon nitride with a thickness of between 100 and 400 nm and obtained by low pressure chemical vapor depositing (LPCVD) or plasma-assisted (PECVD); the supersubstrate 24 is a film of non-intentionally doped silicon oxide with a thickness of between 1 and 6 μm deposited by PECVD. The non-intentionally doped silica has a real index of 1.45 and the silicon nitride an index close to 2.

It is possible to replace the silicon nitride guide film by silicon oxinitride with the formula $SiO_xN_y$ with $0<x<2$ and $0<y<4/3$ whose refraction index is between 1.46 and 2 according to the x and y composition. It is also possible to use aluminium for the guide film, the real refraction index of this aluminium being 1.65, or an organic substance, such as PMMA and polyimides whose refraction indices are between 1.45 and 1.7.

In the embodiment on FIG. 2, the shape of the microguide is fixed by an etching of the superstrate 24 according to the desired pattern. This etching is effected over the entire thickness of the upper film It is embodied by a reactive ionic etching with a plasma of CHF3 for the pure silica.

The absorbers 8 and 10 consist of a film of metal and in particular a film of aluminium about 100 nm thick deposited on the entire structure by means of cathodic evaporation. The shape of the absorbers is obtained by the dry etching of the absorbant film according to the desired pattern, this etching being a reactive ionic type etching with a plasma of CC14 (generally chlorated gas) for the aluminium. It is also possible to use a humid etching by using a solution of H3PO4 for the aluminium.

The radius of curvature of the curved portion 6 of the microguide 4, as well as the lengths L and L' of the straight portions of the microguide, are selected so that the losses of the first guided mode are minimum and that the losses of the other modes are maximum.

Figure 3:
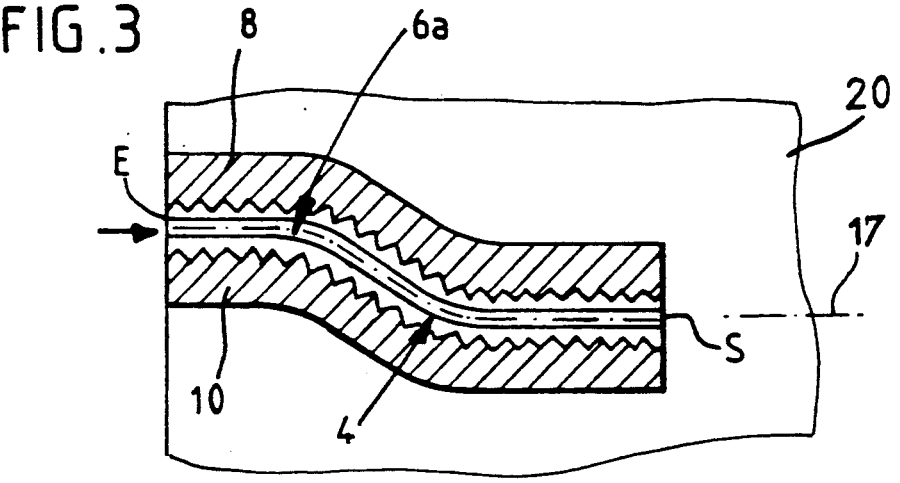

In practice, the microguide 4 shall have an "S" shape, as shown when viewed from above on FIG. 3. On this figure, the "S" bears the reference 6a and the absorbers 8 and 10 marry the shape of the "S".

Any stray light generated either in the substrate 2 or in planary guide mode on both sides of the microguide, especially in the interval d (FIG. 2) separating the microguide from the absorbers at the inlet E of the microguide, may only extend in a straight line. Owing to the "S" shape of the microguide, this stray light is necessarily eliminated by the absorbers.

In the embodiment shown on FIG. 2, the microguide and consequently the optical filter are not protected from the environment. So as to improve effectiveness of the filter, a microguide is generally used protected by a nonconductor.

FIG. 4a–c diagrammatically shows a first method for embodying an optical filter with a protected microguide. This embodiment relates to a microguide having a high index variation. The materials used are those described with reference to FIG. 2.

After successive depositings of the buffer 22, guide 20 and upper 24 films by means of the techniques referred to earlier, an anisotropic etching is made of the upper film 24 according to the "S" shape desired according to conventional photolithoetching methods.

Next, a nonconductor 26 is deposited on the entire structure, as shown on section a of FIG. 4. The nonconductor 26 needs to have a real refraction index equal at the most to that of the upper film 24. For example, the nonconductor may be made of silica, possibly doped with fluorine, thus reducing the refraction index of the silica. Doping is provided by $10^{21}$ to $10^{22}$ doping atoms per cm3.

The thickness of the film 26 needs to be larger than that of the film 24 and, for example, equal to between 1 and 10 μm.

This nonconductive film 26 is obtained by LPCVD or PECVD.

The next stage of the method consists of etching the protection film 26 on both sides of the microguide 4 according to the desired toothed shape for the absorbers. To this effect, a resin mask 27 is formed by means of photolithography on the film 26, thus masking the zone of the film 26 to be retained. This mask comprises teeth on its flanks, these teeth being transferred by anisotropic etching into the film 26.

This etching is a reactive ionic etching using fluorated gases, such as CHF3, as a means of attack.

After elimination of the mask 27, the structure obtained is the one shown on FIG. 4b. Then an absorbant metal film 28 is isotropically deposited on the entire structure and intended to form the absorbers. This isotropic depositing enables this film 28 to marry the toothed shape of the etched film 26 and thus form the teeth of the absorbers.

The etching of the protection film 26 on both sides of the microguide 4 enables the guided stray light to "see the absorbers" and is thus indispensable.

The etching of the protection film may be partial, that is there remains a thickness H of the nonconductor above the guide film 20, as shown on portion b of FIG. 4, or may even be total, which corresponds to H=0. In practice, H is selected as being smaller than the depth of the dying out wave of the guided mode penetrating into the film 26. In particular, for a guided wavelength of 800 nm, H needs to be less than 100 nm for an Si3N4 guide film 20 with a thickness of 150 nm and a film 26 of SiO2.

If protection of the microguide 4 is total, that is if the guided light is completely isolated from the outside which corresponds to an adequate thickness of the film 26 above the microguide 24, the absorbant film 28 cannot be etched to form two distinct absorbers. In this case, the structure of the optical filter is the one shown on FIG. 4-b.

In the opposite case, the absorbant film 28 is anisotropically etched so as to only retain the absorbant material at the feet of the nonconductor 26, as shown on FIG. 4-c, and thus form two distinct absorbers 8 and 10.

One advantageous method consists, as shown on FIG. 5, of forming the absorbers 8 and 10 on both sides of the microguide 4 immediately after etching of the upper film 24 defining the shape of the microguide 4. After the depositing of an absorbant film on the entire structure, followed by an etching according to the desired toothed patterns so as to embody the absorbers 8 and 10, the protection film 26 is deposited on the entire structure.

This method is only applicable if the nonconductor of the film 26 can be deposited after the absorbant material, this being in particular the case for a film 26 of SiO2 deposited by PECVD and an absorbant aluminium film. Generally speaking, this method is not applicable to nonconductors whose depositing temperatures exceed the melting temperature of the metal.

The optical filter of the invention viewed from above on FIGS. 1 and 3 may also be embodied in a structure with a slight index variation, that is with index differences of less than 0.02 between the guide film and the buffer and upper films.

Although the method described with reference to FIGS. 4a–c and 5 may be applicable to structures with a slight index variation, it is preferable to use the methods described hereafter with reference to FIGS. 6a–d to 9.

The embodiment of structures with a slight index variation differ mainly from structures with a high index variation in that the shape and dimensions of the microguide are no longer defined by etching of the upper film or superstrate, but by etching of the guide film.

FIG. 6a–d diagrammatically shows the various stages of a first method for embodying a spatial optical filter in a structure with a slight index variation.

This method, shown on the section a, consists of successively depositing the buffer film 22 followed by the guide structure on the substrate 2 of etching the guide film so as to fix the "S" shape and the dimensions of the microguide 4a. The etched guide film bears the reference 20a. The upper film 24a is then deposited on the entire structure.

Figure 6:
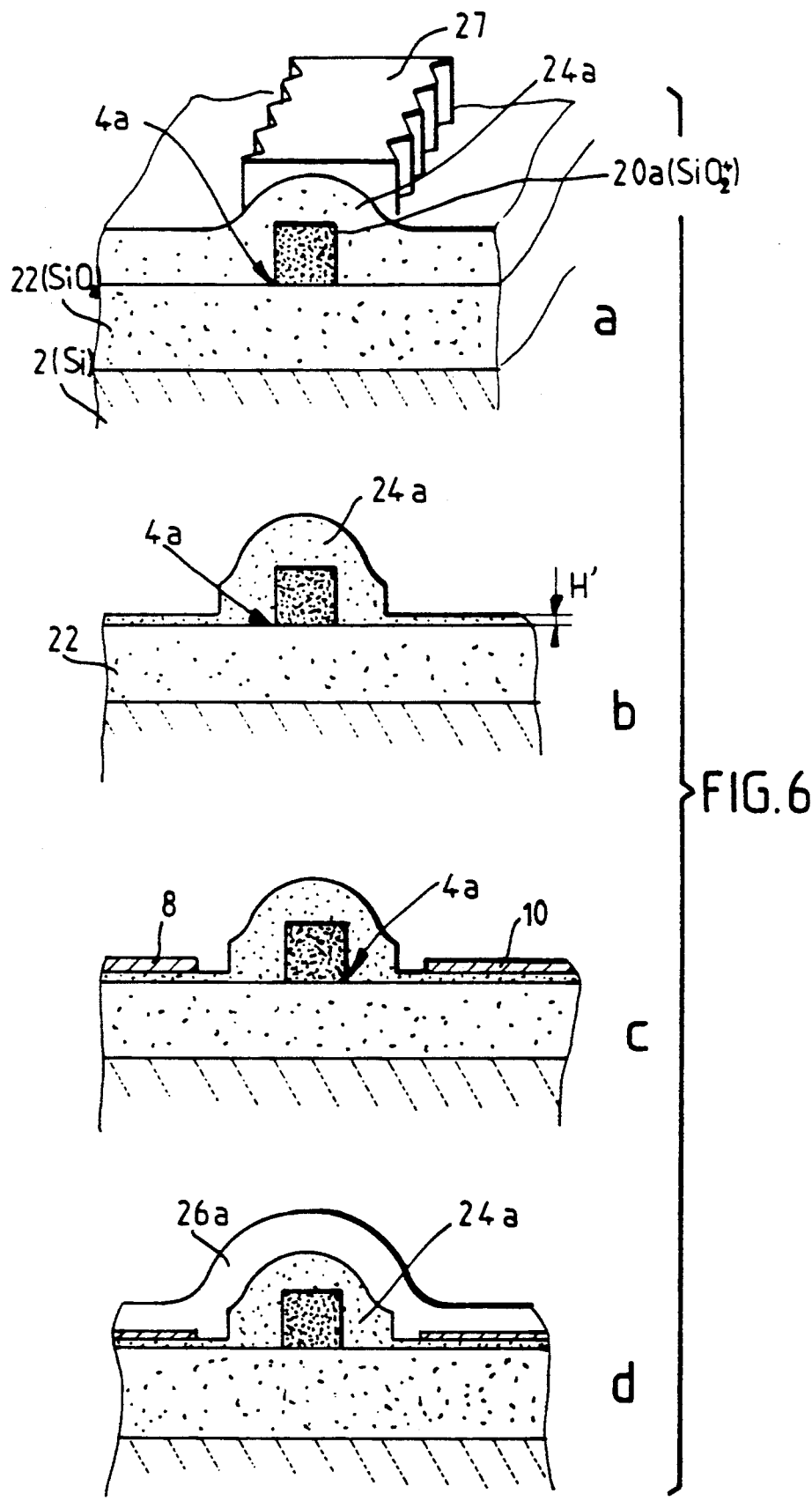
FIG. 6a-d illustrates the various production stages of the optical filter according to a second embodiment.
Figure 7:
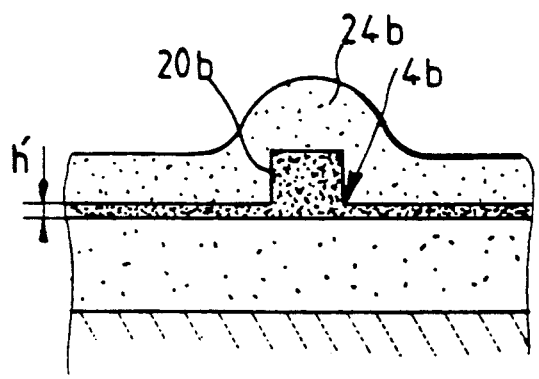
FIG. 7 shows a cutaway view of one production variant of an optical filter conforming to the invention.

The guide film may be etched over its entire thickness, as shown on FIG. 6a–d, or even partially, as shown on FIG. 7. The etched guide film of FIG. 7 bears the reference 20b and the corresponding microguide the reference 4b. The thickness h' of the guide film on both sides of the microguide 4b needs to be less than a value h'max' so that the planary guiding losses in the stray modes are as high as possible. For example, for a buffer film with a thickness of 8 μm, a film 20b with a thickness of 2 μm and an index difference of 10-2, the thickness h' is selected as being less than 500 nm.

The next stage of the method shown on portion b of FIG. 6a–d consists of etching the superstrate on both sides of the microguide 4a according to the desired toothed shape for embodying the absorbers. The upper etched film bears the reference 24a.

The toothed shape is obtained by means of a mask 27 masking the zone of the film overhanging the microguide whose edges are toothed, and then by means of an anisotropic etching of the film 24 so as to transfer these teeth into the latter.

As for the protection film 26 of FIG. 4-a, the etching of the upper film may be embodied partly or totally, the height H' of the material existing on the buffer film 22 being smaller than the penetration distance into the film 24a of the dying out wave of the guided mode in the microguide 4a. The mask 27 is then eliminated.

As shown on section c, an absorbant film, made of metal with a thickness of between 5 and 15 nm, is deposited isotropically, thus marrying the toothed shape of the etched film 24a so as to form the absorbers 8 and 10 on both sides of the microguide 14a.

Then, as shown on portion d, a nonconductor 26a is deposited on the entire structure, this nonconductor having a real refraction index smaller than or equal to that of the superstrate 24a.

By way of example, a structure with a slight index variation comprises a non-intentionally doped film 22 of silicon oxide with the index 1.45 and a thickness of between 8 and 12 μm obtained by the thermic oxidation of a silicon substrate 2 or by PECVD; an etched silicon oxide guide film 20a doped with between 1 to 10 μm of phosphorus, germanium, nitrogen or titanium and having a real refraction index of 1.46; and an upper etched silicon oxide film 24a non-intentionally doped with 2 to 10 μm.

The films of pure doped silica are obtained by PECVD or LPCVD depositing. The absorbers 8 and 10 may be made of aluminium having a thickness of 5 nm, and the nonconductor 26a is made of non-intentionally doped silicon oxide deposited by LPCVD or PECVD and having a thickness of between 2 and 15 micrometers.

Figure 8:
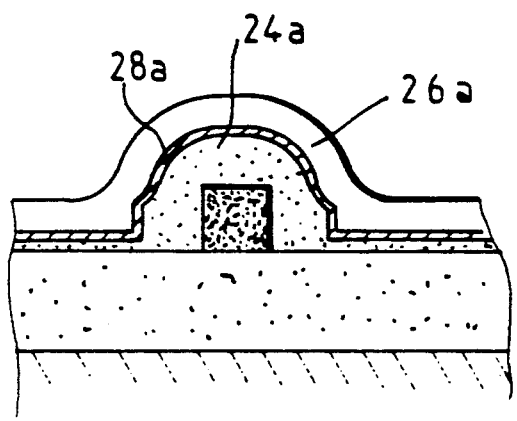
FIG. 8 shows a cutaway view of a production variant of the filter of the invention.
Figure 9:
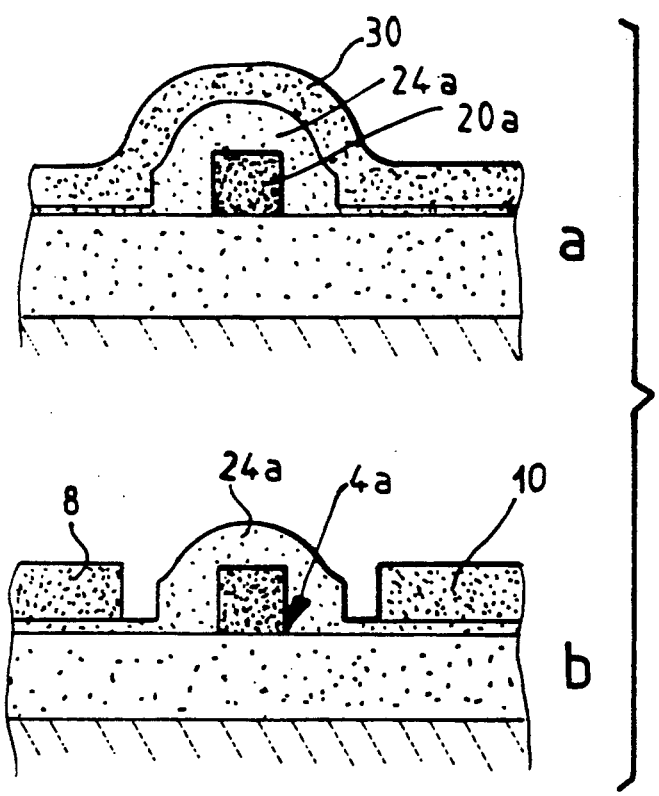
FIG. 9a–b shows the stages for producing an optical filter according to an embodiment variant.

If the upper film 24a has a sufficient thickness to allow the guided light to be completely isolated from the outside, the metal intended to absorb the stray lights may fully cover the structure, as shown on FIG. 8. This continuous metal film bears the reference 28a. This avoids the technical stage for etching the metal film. In particular, this is the case for a superstrate 24a with a thickness of 10 μm for a use wavelength of 800 nm and an index variation of more than 7.10-3 between the guide film and the upper and buffer films.

In the embodiment shown on portion d of FIG. 6 and on FIG. 8, the absorbers are constituted by the etched or non-covered metal film of the nonconductor 26a, latter making it possible for the metal to amplify absorbtion of the stray light.

A second method for embodying an optical filter on a guide structure with a slight index variation is shown on FIG. 9a–b. This method is distinguished from that shown on FIGS. 6 and 8 by virtue of the type of the absorbers used.

Also, after etching of the superstrate film 24a (partial or total) according to the desired pattern (mask 27) so as to establish the shape of the absorbers, a thick absorbant nonconductive film 30 or a film of a semiconductive material is deposited on the entire structure, the real refraction index n of this film being close to that of the upper film 24a and having the reference n', and the imaginary refraction index n" of this material 30 is such that n"2≦(n-n') so as to minimize the luminous reflections to the microguide/absorbers interface and thus favor them moving towards the absorbant medium.

For a non-intentionally doped superstrate film 24a of SiO2, the nonconductor 30 may be an absorbant polymer having a thickness of between 10 and 20 μm and in particular photosensitive resins doped with coloring agents absorbing the light on the use wavelengths.

If the film 24a is sufficiently thick so as to optically isolate the microguide, the nonconductive film 30 does not need to be etched. In the opposite case, as shown on portion b of FIG. 9, this film 30 is etched so as to form the absorbers 8 and 10 on both sides of the microguide 4a.

The etching of the nonconductive film 30 shall be carried out for a pure silica superstrate film 24a whose thickness is less than 10 μm for a wavelength of 800 nm and an index variation of less than 7.10-3.

What is claimed is:

1. Integrated monomode spatial optical filter intended to isolate a first optical mode and eliminate second stray modes, wherein it consists of an optical microguide borne by a substrate and having, along a plane parallel to the surface of the substrate, at least one curved portion whose radius of curvature is such that the losses in the curve of the first and second modes are respectively negligible and extremely large and two light absorbers are disposed inside a given plane on both sides of the curved portion of the microguide.

2. Optical filter according to claim 1, wherein the absorbers extend fully along the curved portion.

3. Optical filter according to claim 1, wherein the microguide has the shape of an "S" in said plane.

4. Optical filter according to claim 1, wherein the side of each absorber opposite the microguide is toothed or notched.

5. Optical filter according to claim 1, wherein the absorbers have dissymmetrical shapes with respect to the optical axis of the filter.

6. Optical filter according to claim 1, wherein the lateral distance of the microguide between its input and its output measured inside this plane is at least equal to 20 μm.

7. Optical filter according to claim 1, wherein the minimum distance measured inside this plane separating the microguide from each absorber is between 3 and 10 μm.

8. Optical filter according to claim 1, wherein the absorbers are made of an absorbant metal.

9. Optical filter according to claim 8, wherein the thickness of the absorbers measured along a direction perpendicular to this plane is less than the depth of the second modes for penetrating into the metal.

10. Optical filter according to claim 9, wherein the metal is covered by a nonconductor.

11. Optical filter according to claim 1, wherein the absorbers are made of an absorbant nonconductive or semiconductive material whose real refraction index n is close to the real refraction index n' of the upper film and whose imaginary refraction index n" satisfies the equation n "2≦(n-n')2.

12. Optical filter according to claim 1, wherein it includes a buffer film, a guide film and an upper film stacked on the substrate, the guide film having a refraction index larger than that of the buffer and upper films, the upper film and the guide film being etched so as to fix the shape of the microguide, and an absorbant film constituting the absorbers.

13. Optical filter according to claim 12, wherein the absorbant film fully covers the microguide.

14. Optical filter according to claim 1, wherein a protection nonconductor is disposed on the microguide and possibly on the absorbers.

15. Optical filter according to claim 12, wherein the substrate is made of silicon, the buffer film and the upper film are made of silica possibly doped with dopers reducing its refraction index, and the silica guide film is made of silica doped with a selected doper increasing its refraction index, namely silicon nitride, aluminium or silicon oxinitride with the formula SiOxNy with 0< X <2 and <y <4/3.

16. Method for embodying an integrated monomode spatial optical filter intended to isolate a first optical mode and eliminate second stray optical modes, wherein it consists of forming an optical microguide on a substrate and having along a plane parallel to the surface of the substrate at least one curved portion whose radius of curvature is such that the losses in the curve of the first and second modes are respectively negligible and extremely high, and of forming within a given plane on both sides of the curved portion of the microguide two light absorbers.

17. Method according to claim 16, wherein it includes the following stages:
 a) depositing a first film on the substrate,
 b) etching this first film so as to form the microguide,
 c) depositing a second film on the structure obtained at b and having a refraction index equal at the most to that of the first film,
 d) etching of the second film on both sides of the microguide so as to establish the shape of the absorbers,
 e) depositing an absorbers film on the structure obtained at d, and possibly,
 f) etching of the absorbant film so as to delimit the absorbers.

18. Method according to claim 16, wherein it includes the following stages:
 a') successive depositings of a buffer film, a guide film and an upper film on the substrate, the guide film having a refraction index larger than that of the buffer and upper films,
 b') etching of the upper film so as to form the microguide, c') depositing a protection film on the structure obtained at b and having a refraction index equal at the most to that of the upper film, d') etching of the protection film on both sides of the microguide so as to fix the shape of the absorbers, e') depositing an absorbant film on the structure obtained at d', and possibly f') etching of the absorbant film so as to delimit the absorbers.

19. Method according to claim 16, wherein it includes the following stages:

A) successive depositings of a buffer film and a guide film on the substrate, the guide film having a refraction index larger than that of the buffer film, B) etching of the guide film so as to form the microguide, C) depositing of an upper film on the structure obtained at B and having a refraction index smaller than that of the guide film, D) etching of the upper film on both sides of the microguide so as to fix the shape of the absorbers, E) depositing an absorbant film on the structure obtained at D, and possibly F) etching of the absorbant film so as to delimit the absorbers.

20. Method according to claim 16, wherein it includes the following stages:

A') successive depositings of a buffer film, a guide film and an upper film on the substrate, the guide film having a refraction index larger than that of the buffer and upper films, B') etching of the upper film so as to form the microguide, C') depositing an absorbant film on the structure obtained at B', D') etching of the absorbant film so as to fix the shape of the absorbers, and E') possible depositing a protection film on the structure obtained at D' and having a refraction index equal at the most to that of the upper film.

21. Method according to claim 18, wherein the buffer film and the upper film are made of silica, possibly doped with dopers reducing its refraction index, and wherein the guide film is made of aluminium, silicon nitride or silicon oxinitride.

22. Method according to claim 19, wherein the buffer film and the upper film are made of silica, possibly doped with dopers reducing its refraction index, and wherein the guide film is made of silica doped with dopers increasing its refraction index.

* * * * *